United States Patent [19]

O'Hare

[11] 4,151,409
[45] * Apr. 24, 1979

[54] DIRECT CURRENT VARIABLE CAPACITANCE ELECTRIC GENERATOR

[76] Inventor: Louis R. O'Hare, 1041 Ponderosa #2, Fort Collins, Colo. 80521

[*] Notice: The portion of the term of this patent subsequent to Jul. 27, 1993, has been disclaimed.

[21] Appl. No.: 761,456

[22] Filed: Jan. 21, 1977

[51] Int. Cl.² .............................................. H01J 39/12
[52] U.S. Cl. ..................................... 250/212; 250/336
[58] Field of Search .................. 250/211 R, 212, 336, 250/215

[56] References Cited

U.S. PATENT DOCUMENTS 3,426,209  2/1969  Sihvonen et al. ................ 250/211 R
3,971,938  7/1976  O'Hare ................................. 250/336

Primary Examiner—David C. Helms

[57] ABSTRACT

A direct current, high voltage generator is disclosed in which electric power is produced by repeated capacitance changes. In various embodiments of the basic electric circuitry, the required capacitance change is effected by various methods, including, especially in the principal embodiment, the method of capacitance change by radiation-variable capacitors the dielectric material of which is uniquely a non-photoconducting material. This generator is distinctive in two basic ways, namely in that it is a complete d.c. generator without an iron core transformer not merely a voltage augmentor and secondly in that the light-variable dielectric material is different from that of prior art generators.

8 Claims, 11 Drawing Figures

DIRECT CURRENT VARIABLE CAPACITANCE ELECTRIC GENERATOR

This invention relates to generators of electric power and methods of producing electricity from energy acting against an electric field. It is one of the types of electric generators which cause a current to flow by moving a charge to and from the plates of a charged electric condenser when the capacitance of the condenser is caused to alternately increase and then decrease. A similar mechanism is to be found in my copending patent applications Ser. No. 669,384, now U.S. Pat. No. 4,074,129, and Ser. No. 663,927, now U.S. Pat. No. 4,087,735, as well as in my former U.S. Pat. No. 3,971,938. It differs from prior generators in that a transformer is not an integral nor necessary part of its electrodynamic action. It is uniquely able to function at very slow rates of capacitance change. Other similar generators using transformers cannot operate with very slow alternations in current direction change without requiring very large iron core transformers. My present invention therefore is a practical and less expensive apparatus and method of producing electrical energy from relatively slow capacitance changes. For instance, in a particular embodiment it is found that some particularly efficient radiation-variable capacitors undergo very large capacitance changes when excited by light or other radiation, but that the capacitance change was necessarily slow and unable to be employed in generators of the prior art, using transformers with magnetic cores, whereas these slow changing capacitors can be employed very effectively in the present invention. The same radiation-variable capacitors could be employed in other generators or they can be employed in apparatus used merely to increase the voltage on a current flowing from another source, that is to say, they could be employed in a voltage augmentor such as the type described in the encyclopedia *Britannica*. But it is the object of this present invention to provide a true electric generator which goes beyond merely increasing voltage on a current flow that is provided by an outside source. On the contrary, this present invention does not merely augment or increase voltage on a current already present, but it generates its own current flow and it is an integral electric generator. Another principal object of the present inventive concept is to provide a very specific type of radiation-variable capacitor to be used in this as well as in other radiation-variable capacitance generators. The type herein described undergoes a repeated change even when a direct current charge is placed across its plates. The unique character of the dielectric of this invention is that it is not of the type founded on photoconductive phenomena within the condenser's dielectric. The light-variable dielectric of the variable capacitors of this present invention does not employ photoconductive materials. It does not surround photoconductive grains with insulating material to form a dielectric material. Consequently, the capacitance changes of this present novel dielectric are not achieved by effectively shortening the separation distances between the plates of a condenser by providing a periodic conductivity in the small parts of the area between the condensers' plates occupied by photoconductive grains. That is to say that in former systems the action of light was to produce many small isolated conductors between the condenser's plates. Light, so to speak, made conductors out of the photoconductor grains and this was like placing isolated conductors between the condenser's plates increasing the capacitance by effectively bringing the condenser's plates closer together shortening their separation distance. In the present invention the necessary increasing of capacitance is not achieved by the formation of conductive areas between the condenser's plates. Insulated photoconductive grains or particles are not used. On the contrary, it is one of the very objects and one of the important achievements of this present invention to exclude or to greatly minimize all kinds of electric conductivity between atoms, ions and molecules within the dielectric of its condenser.

The positive means taken to eliminate or drastically reduce photoconductivity and other types of conductivity distinguishes this present invention from former photoconductive light-variable capacitors and it distinguishes it from former light-variable capacitors not based upon photoconductivity, but which were impeded by photoconductivity and impeded by other forms of conductivity.

Former light-variable dielectrics were of various kinds. They either employed insulated photoconductors such as in U.S. Pat. No. 3,426,209 by Sihvonen, et al., increasing conduction in a limited area to effectively bring a condenser's plates closer together or, on the other hand, they employed materials with variable polarizability characteristics (as in U.S. Pat. No. 3,971,938 by O'Hare). Therein, phosphors effectively shorten the distance between the plates with a d.c. charge, but also effectively increase that distance in alternate periods in order that electricity might be generated. However, the former art light-variable dielectrics operating by the mechanism of variable polarizability have been found to be largely unsatisfactory for purposes of electric power generation and this is due precisely to undesired photoconductivity of the phosphors employed in the prior art. This is because of the fact that when an electric conductor is placed in an electrostatic field the inside of the conductor does not experience the effect of the field. There is no field inside of a conductor. Therefore, conduction photoinduced or otherwise, precludes or at least greatly reduces field interaction with polarizable ions, atoms, or molecules. This is because every polarizability change due to radiation absorption is to be found within a conductor as photoconductivity makes conductors of the radiation sensitive grains. Once the polarizability change is within a conductor it cannot contribute to the dielectric constant nor to the dielectric constant change of the condenser's dielectric.

Both types of the prior art light-variable capacitors are very effective in an a.c. circuit, i.e., when a.c. current is provided for them by some external source and when the a.c. conduction change across the condenser is measured by an a.c. current meter in series with the source and the capacitor. In such a circuit the changes in capacitance of the capacitor with radiation and without radiation can be seen clearly from the changes in the current value conducted in the circuit. Any photoconductivity within the insulating dielectric helps make the dielectric constant of the dielectric photovariable providing a kind of radiation variable capacitor. But these former art light-variable capacitors are not able to effectively undergo repeated capacitance changes when used in a circuit with direct current charge placed upon them, since conductivities within dielectric merely provide for many areas of charge separation. Once there are many places where negative charges can move closer to the positive plate and positive charges can move closer to the negative plate to cause a charge separation within the dielectric itself then the more the total capacitance of the condenser, and the charge it can carry, is going to be determined by the charge separation across those conducting areas than by any dynamics of polarizability happening with the conducting areas. For instance, if granules of metal were embedded in an insulator and used as a dielectric of a d.c. charged condenser, charges would separate across each granule in a very short time and the condenser's value would not be affected by subsequent changes in conductivity of the granules. There is no way in which the dielectric constant could decrease in this d.c. charge situation unless there were something within the metal granules that can cause combining of the charges separated across the metal by the electric field between the plates. There is no provision here for effecting a charge recombination once charges have been separated in a charged condenser. It is not the object of this present invention to provide a mechanism for such a recombination. It is not the object of this present invention to cause the voltage on the plates of a d.c. charged capacitor to elevate by decreasing its capacitance by recombining opposite charges within its dielectric. But it is the object of this present invention to remove nearly all conductivity of whatever kind in order that radiation variable polarizability changes may alone influence dielectric constant changes. This is for the purpose of providing a condenser whose dielectric constant can repreatedly change more effectively when a d.c. charge is placed across its plates. The provision of such a condenser enables a d.c. charged light-variable condenser to have its voltage both rise and fall repreatedly with alternations of dark and light periods. Accordingly, a very specific object of this present invention is to designate light and radiation-variable material that is variable only with respect to polarizability and that is entirely (or nearly so) nonconductive. The active material then is not only embedded in sulating medium but it is of itself of a highly insulating nature. The materials of this present invention then specifically are highly insulating phosphors, i.e., they are a particular class of phosphorescent material as well as a particular class of photo sensitive ferroelectric material which is nonconductive. The phosphors employed here are phosphors whose emission is based on metastable states within an ion or atom or molecule rather than phosphors whose emission is based upon charge separation mechanisms, photoconductivity or trapping centers.

For purposes of clarity the most simple form of the electric mechanism is described first, subsequently the full generating mechanism is described and finally there follows the description of the more effective light-variable dielectrics and capacitors.

Concerning the simple form of the electric mechanism, when a charge is placed on a variable condenser and the condenser is isolated from the source of its charge, one side, i.e., one terminal of the condenser may be grounded without discharging the condenser. If the plates of the condenser are separated a little, the voltage will increase during this separation because the charge is constant (since the condenser is essentially isolated). Then when the charge is constant, and the capacitance is decreased, the voltage must increase because the product of voltage and capacitance must continue to be equal to the unchanged charge. If the action to pull the plates apart continues, there is a point at which there will be very little binding of charges, and negative charges on one side of the condenser will no longer "bind" or hold the opposite positive charges on the opposite plates and visa versa. The charge on the grounded plates will then be free to move to the ground. Then, the nongrounded side of the condenser will be left with a high voltage isolated charge. It is isolated in the sense that it has nowhere to go. If subsequently the grounded plate is repositioned closer to the charged plate, it will acquire a charge of sign opposite to that on the isolated plate. This action of separating these respective plates can be repeated. In this case a current would alternate back and forth to the ground from the grounded plate as a charge moved to and from this plate. When a rectifier is placed in series with this same grounded plate so that the charge can flow from the ground to the condenser plate but not back to the ground, then pulling the condenser plates apart will cause a voltage increase on opposite plates. When a second rectifier and a resistor are connected to the grounded plate of the condenser and grounded then, when that charged condenser's plates are again separated, the voltage elevation (as the charges no longer bind each other) will not cause a current flow through the first rectifier to the ground, but, due to the polarity positioning of the second rectifier, the charge will flow through the second rectifier and the series resistor to the ground. When the positioning of the plates is again closer, the charge on the isolated plate will bring a charge up from the ground through the first rectifier to the grounded plate. Again opening the plates will cause a return of the charge to the ground through the second rectifier. An electric pumping action resulting in a single direction flow to and from the ground takes place. The ground acts as the reservoir for the charge that is brought from it in one place, and returned to it in another place.

Now, however, in a principal embodiment of this present invention, instead of using the ground as a source of charge, another condenser is used as a source from which the charge is moved. Instead of returning the charge to the ground, the mobile charge is moved by the same kind of action described above, to a third condenser. In short, the same type of pumping action, described above, makes use of a variable condenser to remove a charge of one sign from one uncharged condenser, and to place this charge on a third condenser. For instance, the variable capacitor removing electrons from an uncharged, fixed capacitor may place these electrons on a third, formerly uncharged capacitor. A single rectifier on what was called the "isolated" plate of the variable condenser adequately maintains the isolation of its charge, while enabling condensers to take the place of grounds as reservoirs from which and to which a charge may be moved by a variable capacitor. Using condensers as reservoirs has the advantage over using the ground as a source of electrons or other charges in that the condensers become sources of energy for doing electrical work when a charge separation is produced across their plates. Since radiant energy can be made to change capacitance repeatedly through the use of a radiation-variable capacitor, it can hereby cause a charge separation which results in charging capacitors according to the mechanism of this present generator. Electrical energy may be removed from the fixed capacitors in the form of usable electric power at the same time that the condensers continue to be charged.

Further clarification of the electric mechanism as well as clarification of the way in which dielectric constant change is improved is given by reference to the drawings.

FIG. 1 of the drawings shows a d.c. variable capacitance generator without a transformer and in a simple form.

Figure 7:
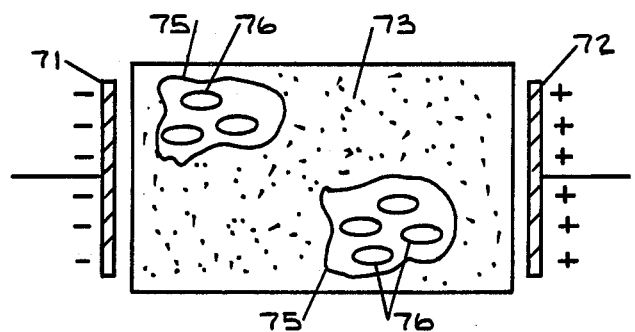

FIG. 7 of the drawings shows a nonconducting grain in which the electron polarization of the ions, atoms and molecules within the grain can greatly affect the dielectric constant of the grain.

Figure 8:
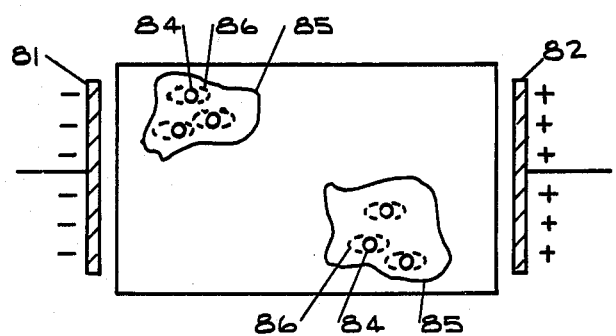

FIG. 8 of the drawings is a pictorial representation of electron polarizability increasing with a consequent dielectric increase.

Figure 1:
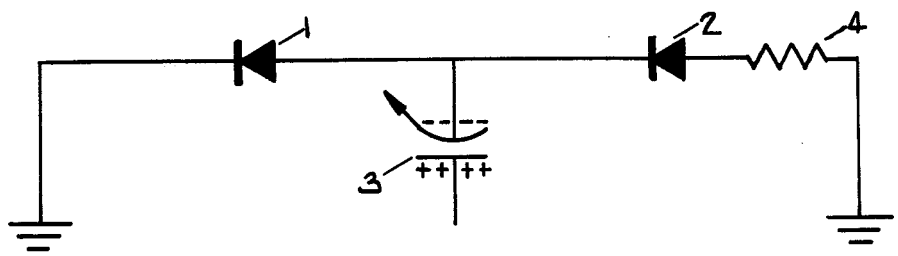
FIG. 1a is a diagram of a charge flow as capacitance decreases and voltage increases.
FIG. 1b is a diagram of charge flow as capacitance increases.
FIG. 1c shows total current flow as the variable capacitor repeatedly changes.

Referring then to FIG. 1, rectifier 1 allows electrons to move from the ground to capacitor 3 only, while rectifier 2 allows electrons to flow from capacitor 3 to ground only through resistor 4. Resistor 4 represents any electric work load.

Figure 1A:
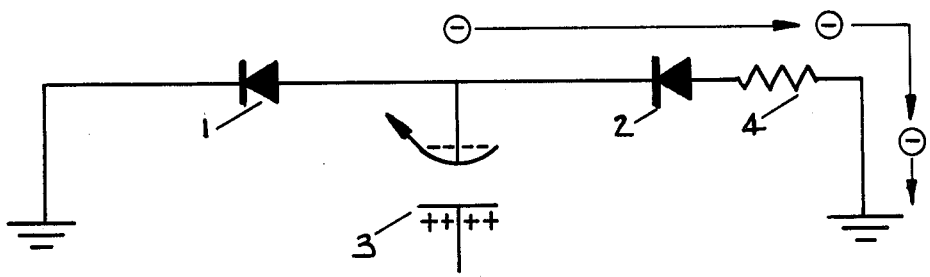

Referring then to FIG. 1a as capacitor 3 opens and reduces its capacitance, electrons are no longer tightly bound to plus charges, but repel each other, moving charge to ground through resistor 4.

Figure 1B:
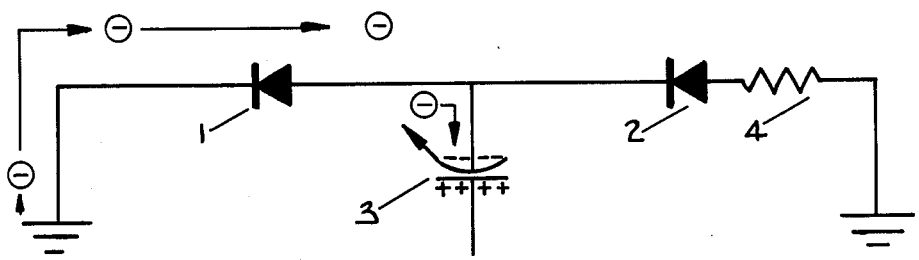

In the following FIG. 1b as capacitor 3 increases in capacitance, electrons are attached to condenser plates opposite isolated positive charge. Incoming to 3, they move through 1.

Figure 1C:
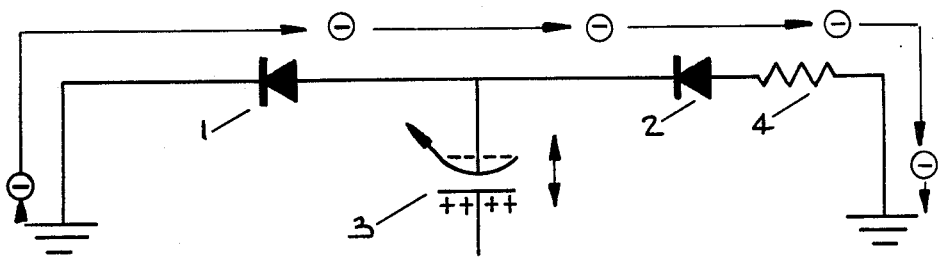

Then in FIG. 1c the total current flow can be seen moving in one direction from ground to ground through 1, 2, and 4 as a result of repeated capacitance changes in 3.

Figure 2:
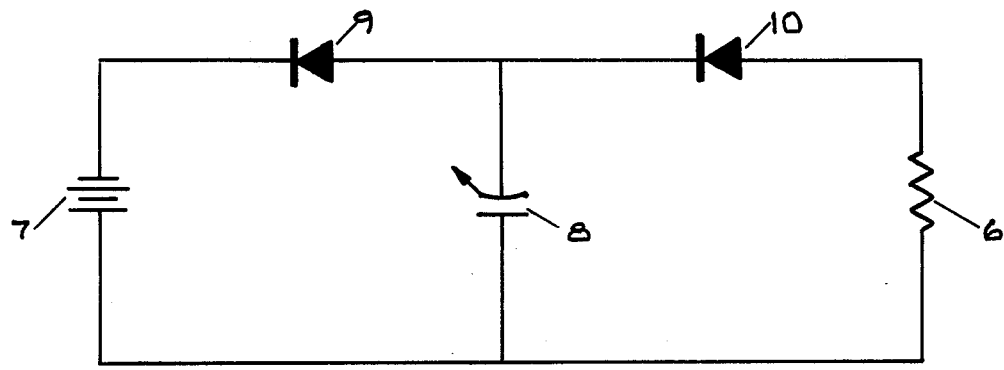
FIG. 2 is a partial and incomplete generator requiring an external source of current.

Referring now to FIG. 2 current from source 7 fills and charges capacitor 8 through rectifier 9, and when capacitance of 8 decreases voltage rising on 8 is prevented from returning charge to source 7 by rectifier 9, but rectifier 10 allows current with elevated voltage to continue to work load 6 with increased voltage. The mechanism of FIG. 2, thereby differing from that of FIG. 1 in that the mechanism of FIG. 1 requires merely an isolated charge, while that of FIG. 2 requires a constant source of current.

Figure 3:
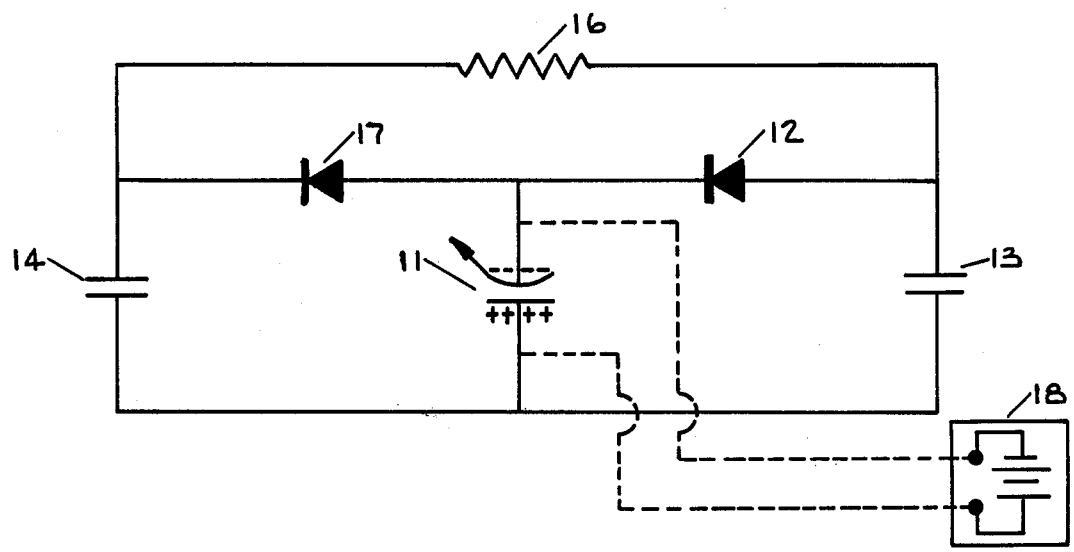
FIG. 3 shows a schematic of an integral variable capacitance generator for producing a direct current and without a transformer.

Referring then to FIG. 3 and the generator using capacitors as reservoirs in place of ground reservoirs. A charge placed on variable capacitor 11 also charges condenser 13 moving through rectifier 12 and this same charge source charges 14 through 12 and through load resistance 16. The dotted line connections from power source 18 are intended to show that 18 is used only occasionally for charging purposes and then removed from the generating circuit. A portion of the total charge of all three condensers moves from 11 to 13 to 14 when the capacitance of 11 decreases and its voltage is thereby caused to rise. For instance, when electrons are on the upper plates of these condensers and the capacitance of 11 is made to decrease, the voltage on 11 and therefore the electron pressure rises forcing electrons through 12 to 13 and through 12 and 16 to 14. Subsequently, when the capacitance of 11 again is made to increase, having lost some of its charge during the period when the voltage was higher, capacitor 11 is at this time left with a voltage lower than and a number of electrons on its top plate less than 13 and 14. Because of 12 rectifying electrons cannot flow from 13 through 12 to 11, but they must come from 14 via 17 to 11. The cycle is repeated the next time the capacitance of 11 is made to decrease and the electron flow in this example will always be in one direction through load resistance 16.

Figure 4:
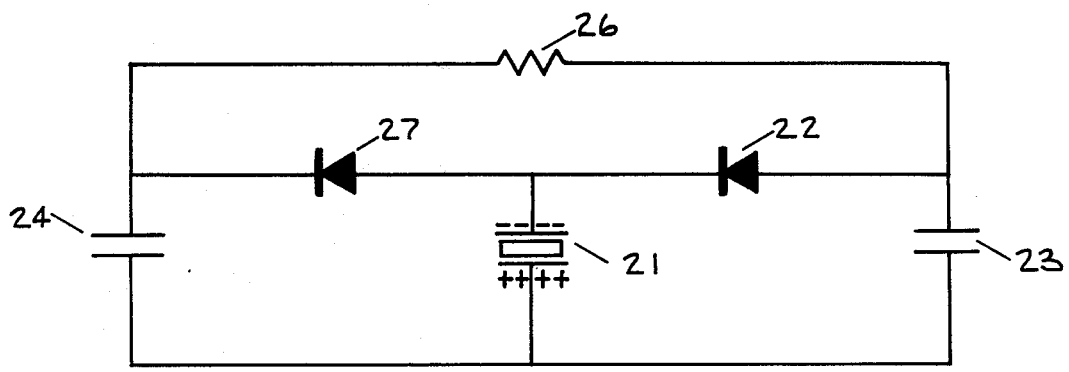
FIG. 4 depicts a variable capacitance generator circuit employing a radiation-variable capacitor as the variable capacitance source.

In reference to FIG. 4, condenser 24 and 23 correspond to condensers 14 and 13 respectively of FIG. 3. Similarly, rectifiers 27, 22, of FIG. 4 correspond respectively to rectifiers 17, 22, of FIG. 3 with a similar correspondence between resistors 26 and 16 of FIG. 3. Light or radiation-variable capacitor 21 is shown in FIG. 4 and its dielectric material undergoes an effective dielectric constant change under the influence of radiation when the radiation excites electrons in this material to excited, i.e., metastable states. When electrons in significant numbers populate orbitals farther removed from the nuclei of atoms in the dielectric constant greatly increases, thereby increasing the capacitance of the radiation variable capacitor. When electrons subsequently return to the ground state, the condensers capacitance thereupon decreases to complete one cycle of variation as radiation first impinges upon and then is removed from this variable capacitor. Repeated cycling produces repeated changes. The material of this condenser's dielectric may be composed of any or of any combination of a large number of insulating phosphors or of photoreacting nonconducting ferroelectrics, and the alternation between periods of radiation on the dielectric and periods of absence of radiation is accomplished by means of a shutter periodically interrupting the radiation or a moveable reflector directing a beam of radiation to and from this dielectric, as in copending applications 663,927 and 669,384.

Radiation-variable dielectric material of this present invention which is based upon the exclusion of electrical conductivity from excited state compounds is realized in a number of ways. It is realized when ions of a radiation absorbing nature exist in a solid non-conductive solution such as a glass like borate glass, called crown glass. The neodymium ion produced by the solution and excited by radiation like visible light to a metastable state must be in sufficient concentration in proportion to the total mass of the solution that its (the ion's) contribution to the total dielectric constant will be significant. Mole concentrations of up to six percent are known to be used in glass lasers for example, and the use of glasses desolving this and higher proportions are desirable.

Likewise Yttrium aluminum garnet $Y_3AL_5O_{12}$ in which 1.5% or more of neodymium oxide is dissolved provides a light sensitive insulating dielectric for a light variable capacitor as does a 2% or more solution of neodymium oxide in calcium tungstenate. Again neodymium ions can be formed in calcium lithium borate glass called Calibo and by a similar dissolving of their oxides any or any combination of the ions of Neodymium, Yttebium, Gadolinum and Holmium can be sources of metastable-excited states when in solution in lithium silicate glasses such as $Li_2O$—$Mgo$—$Al_2O_3$—$SiO_2$.

Ruby crystals in which 0.5 percent of Chromium oxide or more is dissolved into $Al_2O_3$ may be used as a light variable dielectric of highly insulating qualities. The oxides of Uranium, Neodymium, Samarium, Dysprosium, Thulium and combinations of these may all be dissolved in a gram mole percent of 0.5 percent and more into Calcium Fluoride, $CaF_2$ to provide radiation varible dielectrics. These same last mentioned oxides may likewise be dissolved into Barium and Strontium Fluorides in similar proportions for the same result namely the production of light variable dielectrics. Nickel and Cobalt excitable ions are similarly provided for light variable dielectric material by dissolving oxides and other salts of these metals in similar small proportions into $MgF_2$ and/or $ZnF_2$.

Generally, divalent and trivalent rare earths may be dissolved into glasses and crystals employed in the laser art both according to the proportions of that art as well as with higher concentrations of the rare earth ions to provide electrically non-conductive light and radiation variable dielectrics for capacitors to be used in variable capacitance generators for the provision of electric power.

In a further embodiment of the basic inventive concept sensitized fluorescence is used to broaden the range of radiation frequencies that can be accepted by the phosphor. For instance, active Thulium ions dissolved in crystaline $CaMoO_4$ are made to benefit and be excited by a much broader range of frequencies when combined in this host crystal with a small percentage of Erbium. In the same host crystal Holmium and Erbium perform well together. When Yttrium Aluminum Garnet is employed as the host crystal Erbium and Ytterbium combination of active ions broaden the absorption spectrum as do other combinations, for instance Thulium and Holmium as well as Neodymium and Ytterbium.

Again the absorption spectrum may be broadened in a dielectric utilizing Holmium and Thulium ions dissolved in Erbium Oxide even though Holmium alone is a very active ion in Erbium Oxide host crystal. Combinations are effective in glass dielectrics as well and while none of the above combinations used as examples is intended to limit the combinations possible they are noted to stress the principle. The combination of ions of Ytterbium, Neodymium and Erbium dissolved together in lithium silicate glass provides a dielectric with a broad band of absorption. Similarly, mixtures of any or all of the ions of Cs, $Uo_2$, Cu, Mn with Neodymium ions in a lithium silicate or other suitable laser type glass will cause broader absorption and greater activation of the Neodymium ions.

Generally these glasses and crystal matrixes are melted according to standard state of the art technology for lasers and a high concentration of any salt of the active ion of the desired activator/activators is dissolved into melt, the concentration density being the highest possible consistent with strong fluoresence at high excitation levels. These glasses or crystal matrixes are then cooled and ground to a fine powder or frit. The powder is applied to a metalic conductive plate and enameled onto the plate by heating to the fusing point of the enamel. After cooling a conductive layer such as Stannic oxide, Indium or Gold is then vacuum deposited on the dielectric enamel to provide the opposite plate of the condenser. The thickness of the enameled layer of light-variable dielectric must be great enough to prevent electric breakdown of insulation at the particular voltage used in the generating circuit. The dielectric enamel must be thick enough and doped with the active element in sufficient density to absorb and interact with a sufficient quantity of light. Alkali halides such as the salt Potassium chloride activated with Tellurium are nonconducting phosphors based upon metastable state phenomena which undergo dielectric constant change when excited by light or other radiation and therefore provide the dielectric material of this generator's capacitor. Similarly, Rubidium halide phosphors activated with a few percentage parts by weight of Tellurium exhibit a phosphorescence based on electrons being raised to excited states which lie below the conduction band and are therefore nonconductive and provide suitable material for the dielectric of the generator's variable capacitor. Such alkali halide and rubidium halide phosphors are also activated for dielectric constant change by the addition of up to several percentage parts by weight of metals such as lead, tin, gallium, indium, germanium, copper, silver, europium, etc.

Numerous ferroelectric compounds can absorb light energy and are otherwise responsive to radiant energy. This class of materials therefore provides capacitor dielectric changeable by the influence of radiation and useful for application in this generator. Some examples are lithium tantalate, $LiTaO_3$, lithium niobate, $LiNbO_3$, tungsten trioxide, $WO_3$, etc.

This light or radiation-variable capacitor 21 of FIG. 4 is usually constructed with two condenser plates between which is a very thin (2 to 10 mils in thickness) dielectric material of very high dielectric strength. A transparent electrically conductive material is used for at least one of the condenser's plates. The transparent conductive material must be transparent to the particular frequencies of radiation employed. Any or any combination of the above insulating radiation-variable dielectrics is employed as the dielectric material between the condenser plates. Those dielectrics whose composition depends on solid solution in a glass may be positioned between the condenser plates in the form of glass plates or may be enameled onto the condenser plate according to the technique of fritting. Other powders of the above dielectric materials which mix with glass may be enameled with glass powder onto one of the condenser's plates. Powders of the above dielectric materials may likewise be suspended in plastic insulators as is practiced in the electroluminescent panel art.

Figure 5:
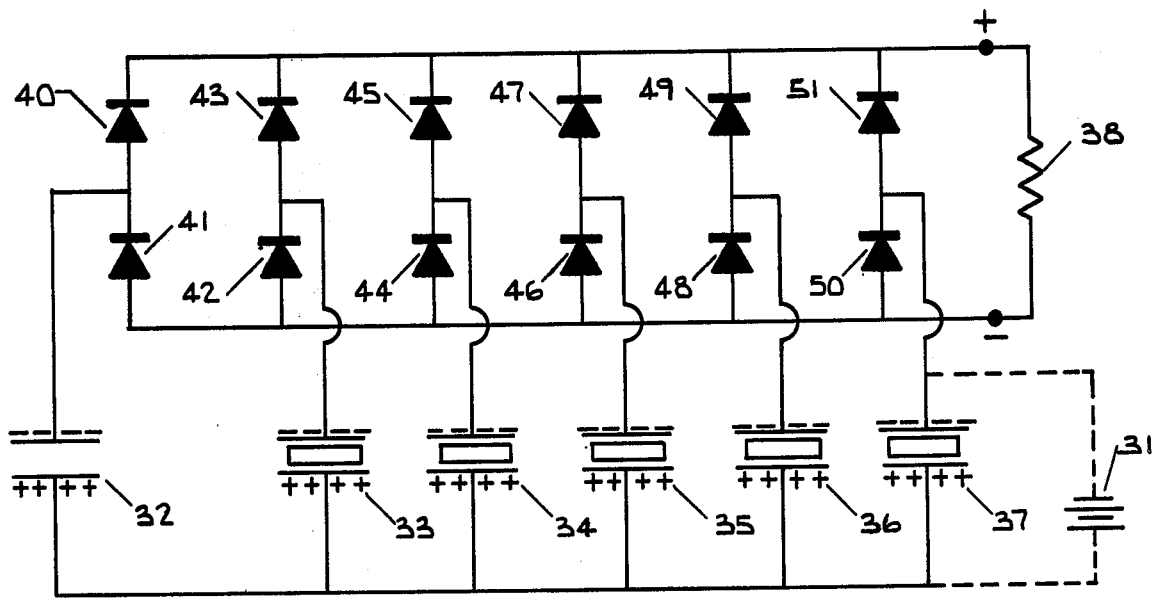
FIG. 5 shows a radiation-variable capacitance generator employing multiple radiation-variable capacitors.

Referring then to FIG. 5 exciter power supply 31 places a charge on capacitor bank composed of fixed capacitor 32 and radiation-variable capacitors 33, 34, 35, 36 and 37. Exciter power supply is removed leaving a charge upon all capacitors which load resistor 38 is not able to remove, since the entire upper assembly composed of all rectifiers, and resistor 38 merely forms a common connection for the upper plates of all capacitors, and cannot discharge the capacitor bank, as no current path is ever formed across the capacitor bank. Even capacitor in the bank has a portion of the total charge depending upon its capacitance value. Light or other radiation (such as U.V., infrared or nuclear radiation) is incidented successively, or at least disperately upon radiation-variable capacitors 33, 34, 35, 36, 37. The light or radiation increases the capacitance of the particular capacitor/capacitors it is impinging at any given instant in time. The particular capacitor/capacitors receive a large portion of the total charge of the entire bank at the time they are receiving radiation. Every charge redistribution caused by any and every capacitance change in the network, must move through a corresponding bridge network and through resistor 38 to make the shares of the total charge correspond to the new capacitive values of each condenser. For instance, if radiation is incident upon radiation-variable capacitor 33, and its capacitance is thereby increasing, it is thereby receiving electrons in the process of redistribution through rectifier 43, but it cannot receive electrons through 45, 47, 49, nor 51, nor 40. It can only receive electrons which come through resistor or load 38. These electrons may be supplied by capacitors 32, 34, 35, 36 and 37, through rectifiers 41, 44, 46, 48 and 50, but all of the electrons to 33 must flow through 38 where electric work can be done.

Similarly, if, instead of 33, radiation were falling upon capacitor 36, all electrons coming to 36 in the redistribution, would flow through only rectifier 49, after flowing through load resistor 38. These electrons would come from the upper plates of 32, 33, 34, 35 and 37 via rectofiers 41, 42, 44, 46, and 50, and each electron would, of necessity, move through 38, where it would be able to do work. In the same way, any condenser, that would be increasing in capacitance at any instance, would receive electrons from a current flow through 38. The same is true of any and all combinations of radiation-variable capacitors, which should receive radiation simultaneously, and be simultaneously increasing in capacitance, i.e., if 33, 34, 35, 36, and 37 were all receiving electrons due to capacitance increase, then rectifiers 43, 45, 47, 49 and 51 would be admitting electrons to all of those capacitors, with all of the electrons coming from fixed capacitor 32 via 41, and all of the electrons flowing through work load resistor 38.

Alternatively, if all radiation-variable capacitors were darkening from the removal of radiation, except 33, which is receiving radiation, then the darkening capacitors, which are thereby undergoing an increase in voltage and a decrease in capacitance, will be impelling electrons to 33 and 32. The electrons must travel through 40 and 43, all of them moving through 38 via 44, 46, 48 and 50. In the event only one was darkening and increasing in voltage, while decreasing in capacitance, the current flow would still, of necessity, be through 38. For instance, if 35 were alone, darkening its rise in voltage would impel electrons through 46 and 38 to 32, 33, 34, 36 and 37 via 40, 43, 49 and 51, all the current still, of necessity, passing through 38.

Figure 6:
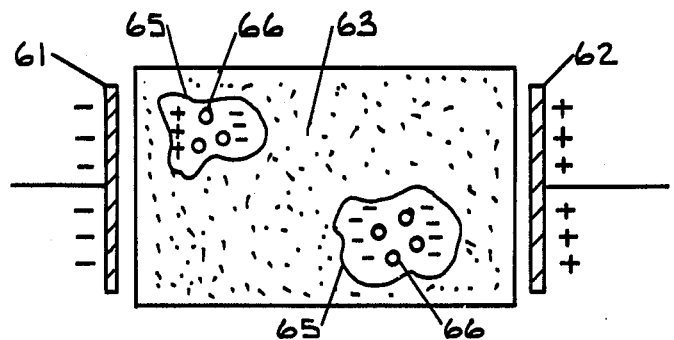
FIG. 6 shows a diagramatic view of a charged capacitor in which the conductivity of a phosphor grain enables a charge separation across the grain and reduces the effect of the electrostatic field within the grain.

Referring then to FIG. 6 of the drawings, charges placed on 61 capacitor plates and 62 introduce an electric field in dielectric insulator 63 in which is embedded conductive phosphor grains 65 which are some of many such phosphors within the dielectrics insulating medium 63. (The other phosphor grains are not shown). In that grains 65 are conductors the influence of the field is effectively excluded from electron polarizable ions, molecules and atoms 66 within the grain and recipricall the polarizability contribution of polarizable ions, atoms and molecules to the total dielectric constant is excluded or greatly diminished. Because of this radiation stimulated polarizability changes are prevented from causing dielectric constant changes.

Referring next to FIG. 7 of the drawings charges placed on capacitor plates 71 and 72 introduce an electric field in dielectric insulator 73 in which are embedded non-conductive phosphor grains 75 which are some of many such phosphors within the dielectrics insulating embedding medium. (The other phosphor grains are not shown). In that grains 75 are non-conductors the influence of the electric field is experienced upon polarizable ions, atoms and molecules 76 within the grain thereby enabling the polarizability of atoms, ions and molecules 76 within the grain to make a significant contribution to the total dielectric constant and thereby permitting the dielectric constant to change when polarizability changes.

Referring then to FIG. 8 of the drawings, charges placed on capacitor plates 81 and 82 introduce an electric field on insulating dielectric and insulating grains of phosphor 85 causing an electron polarization across an excitable ion 84 shown diagrammatically by an extension of the electron cloud in the field. The resulting farther extension of this electron cloud when it is subsequently raised to an excited state by means of radiation is shown by dotted lines 86 representing a light induced increase in dielectric constant value of ions, atoms or molecules of the dielectric thereby causing a total dielectric constant change of the dielectric with light or radiation.

I claim:

1. A method of generating direct current electricity from radiant energy by means of radiation variable capacitance by:

periodically directing radiation on a radiation sensitive dielectric material whose effective dielectric constant changes under the influence of incident radiation, placing an electric charge on said radiation-variable capacitor and removing the source of the charge, employing said radiation-variable capacitor in an electric circuit comprising two rectifiers, and an electric load resistance and two fixed condensers in such a manner that the initial charge on the variable capacitor is distributed through a rectifier to one fixed condenser as well as through that rectifier and through a load resistance to the other fixed condenser, all three condensers having a common connection on their plates opposite the rectifier connections and, employing the alternate voltage elevations and depressions from the activated radiation-variable condenser in such a way that, when that condenser's voltage is elevated by having its capacity reduced, the rectifiers connected to its terminal will allow the current flowing from it to move in only one direction as it elevates the voltage on the two fixed capacitors, one rectifier functioning to conduct current at this time with the second rectifier functioning during a subsequent period of depressed voltage on the radiation-variable capacitor to admit current from the fixed condensers which at that time will have higher voltage than the radiation-variable capacitor will have, providing for an isolation of the total distributed charge by insuring that no resistance is connected across any condenser or group of condensers sharing the total charge, periodically restoring any of the isolated charge which may have leaked off of the condensers by occasionally connecting the power supply and then removing it, utilizing electric power from a one direction current flow through the load resistance from which useful work energy is extracted.

2. A method of generating direct current electricity by means of radiation-variable capacitance as in claim 1 in which the radiation-variable dielectric material of the radiation-variable condenser is an insulating, non-conducting phosphor the photoactivation of which is not based upon photoconductivity and the presence of trapping centers but upon the absorbtion of radiation by an activator element such as an ion, atom or molecule which is excited by the radiation to an energy state below the conduction band.

3. A method of generating electricity as in claim 2 in which the insulating, non-conducting phosphor dielectric is a dielectric selected from the group consisting of alkalai halide phosphors and rubidium halide phosphors activated by one activator selected from the group consisting of tellurium, lead, tin, gallium, indium, germanium, copper, silver, and europium.

4. A method of generating electricity as in claim 2 in which the insulating, non-conducting phosphor dielectric is a dielectric selected from the group of glass laser phosphors in which metalic oxides selected from the group consisting of neodymium, gadolinium, holmium and combinations of these are disolved in lithium silicate glasses thereby providing excitable ions.

5. A method of generating electricity as in claim 2 in which the insulating, non-conducting phosphor dielectric is a dielectric selected from the group of crystal laser phosphors consisting of phosphors in which the oxides of metals selected from a group of metals consisting of uranium, neodymium, samarium, dysporsium, thulium, are disolved into fluoride salts selected from the group of fluoride salts consisting of calcium fluoride, barium fluoride and strontium fluoride.

6. A method of generating electricity as in claim 2 in which the insulating, non-conducting phosphor dielectric is a dielectric selected from a group consisting of crystal laser phosphors in which chromium oxide is disolved into aluminum oxide.

7. A method of generating electricity as in claim 2 in which the insulating, non-conducting phosphor dielectric is a dielectric selected from a group consisting of neodymium oxide disolved in yttrium aluminum garnet and neodymium oxide disolved in calcium tunstenate.

8. A method of generating direct current electricity from radiant energy by means of radiation-variable capacitance by:

forming a capacitor bank of many radiation-variable capacitors and one fixed capacitor having one set of plates from each capacitor connected to one common terminal, each single condenser's opposite plate being connected to its own set of two rectifiers, one rectifier of each set of two enabling negative current flow outward and away from each single condenser and the other rectifier of each set of two enabeling current flow to the single condenser to which it belongs, those terminals of all rectifiers able to carry only a negative charge from their respective capacitor all being connected to a common terminal, this terminal being the negative output terminal of the generator, the other rectifiers of each set of two that is connected to each capacitor thereby enabling current flow inward and each said single capacitor and each of said rectifiers having a terminal through which current can only flow to its capacitor, said terminals being connected to a common terminal forming the generators positive terminal and, charging this capacitor bank with a power source and removing the power source thereby providing a bank of charged condensers isolated from the power source and, alternately providing periods of radiation and non-radiation on the radiation sensitive dielectric of each condenser and, extracting useful electric power from an electric load connected across the output terminals.

* * * * *